(No Model.)

C. R. H. M. HABENICHT.
PROCESS OF AND APPARATUS FOR CRYSTALLIZING TIN.

No. 300,599. Patented June 17, 1884.

WITNESSES:
William Miller
Chas. Wahlers

INVENTOR
Charles R H M Habenicht
BY Van Santvoord & Hauff
ATTORNEYS

UNITED STATES PATENT OFFICE.

CHARLES R. H. M. HABENICHT, OF NEW YORK, N. Y.

PROCESS OF AND APPARATUS FOR CRYSTALLIZING TIN.

SPECIFICATION forming part of Letters Patent No. 300,599, dated June 17, 1884.

Application filed December 29, 1883. (No model.)

*To all whom it may concern:*

Be it known that I, CHARLES R. H. M. HABENICHT, a citizen of the German Empire, residing at New York, in the county and State of New York, have invented new and useful Improvements in Process of and Apparatus for Crystallizing Tin, of which the following is a specification.

My invention relates to the manufacture of crystallized tin plates; and it consists in the novel process and apparatus hereinafter described, whereby a superior effect is produced.

Figure 1:
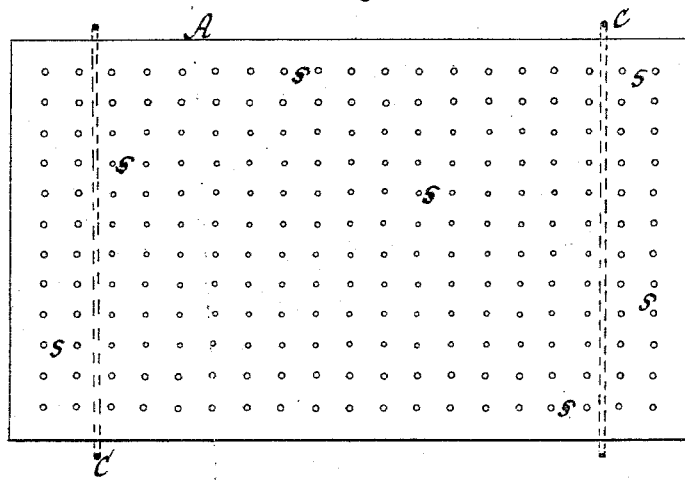
Figure 2:
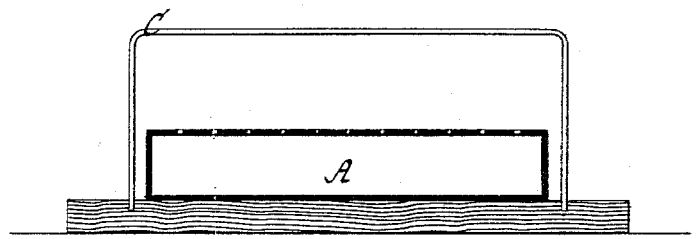
Figure 3:
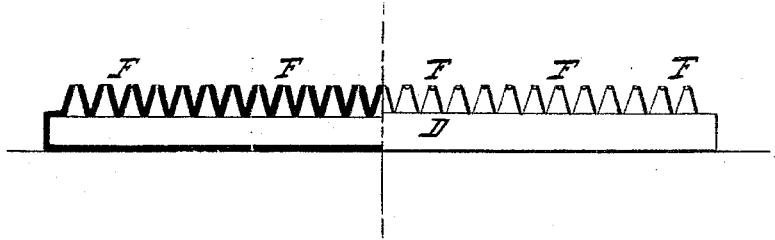
Figure 4:
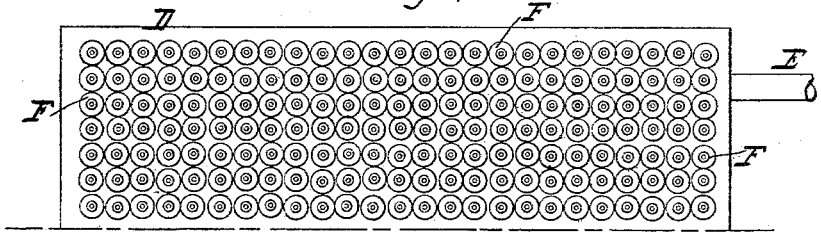

In the accompanying drawings, Figure 1 is a plan or top view of an apparatus for heating the tin plates. Fig. 2 is a cross-section thereof. Fig. 3 is a longitudinal section of an apparatus for cooling the tin plates. Fig. 4 is a plan or top view of the same.

Similar letters indicate corresponding parts.

In carrying out my invention I first heat the tin plates sufficiently to melt the tin, and then immediately cool the plates with water, thereby producing the crystallization, as well known. By the heating and cooling of the plates the tin is partly oxidized, and to remove the oxide coating thus created I now treat the plates with an aqueous solution of caustic soda, using about one pound of caustic soda to three gallons of water, by momentarily dipping the plates therein, or in any other suitable manner. I then treat the plates with nitro-muriatic acid, also by momentarily dipping the plates therein, or in any other suitable manner, the effect of which is to develop the marks of crystallization produced by the heat and water. The nitro-muriatic acid should be diluted with water in about the proportion of three parts of nitric acid and one part of muriatic acid to forty parts of water, the whole being mixed together, and when the plates have been treated with acid they should be washed with clean water and thoroughly dried, and then they are ready to be varnished or japanned. The plates should also be washed with clean water when they have been treated with the solution of caustic soda.

An important step in the foregoing process, and one which is essential to my invention, consists in treating the tin plates with the solution of caustic soda for removing the oxide coating, because such coating, if left on the plates, as heretofore, seriously interferes with the subsequent action of the acid in developing the crystallization.

The apparatus which I use for heating the tin plates consists of a chamber, A, which receives gas from a proper source through a pipe, B, and is constructed with a plane upper surface, which is perforated throughout with fine holes $s$, through which the gas may escape, forming, when lighted, numerous jets of flame, which supply the required heat. That portion of the holes $s$ adjacent to the edges of the chamber A is larger than the other or remaining portion of the holes, as shown in Fig. 1, and consequently the flames are larger in area at those points, owing to which and the uniform supply of gas to all the holes, the tin plates which are exposed to the action of the flames are heated with uniformity. To support the tin plates over the gas-flames, bows or frames C of the proper shape may be used.

The apparatus which I use for cooling the tin plates consists of a chamber, D, which may be supplied with water through a pipe, E, having a suitable cock, and from which the water is distributed to a series of spouts, F, projecting upwardly from the top of the chamber. The orifices at the upper ends of the spouts F are in the same horizontal plane, and in practice the heated tin plates are laid thereon, the spouts serving as supports for the plates, so that when the water, which should be under pressure, is turned on it acts on the plates. The spouts F bear a fixed relation to each other in position, and by this means the marks of crystallization formed on the plates are made to take approximately symmetrical positions—as, for example, by arranging the spouts opposite to each other in straight rows, as shown in Fig. 4, marks of approximately-square shape are produced.

I am aware that nitro-muriatic acid, and also a mixture of nitric and sulphuric acid, has been used in the crystallization of tin plates, and I do not claim such, broadly, as my invention.

What I claim as new, and desire to secure by Letters Patent, is—

1. The process of crystallizing tin plates, which consists in heating and cooling the plates, subjecting them to the action of an aqueous solution of caustic soda to remove the oxide coating, and finally developing the crystallization by subjecting the plates to the action of an acid, substantially as described.

2. The within-described process of crystallizing tin plates, which consists in first heating the plates to melt the tin, then cooling the plates with water to produce the crystallization, then treating the plates with an aqueous solution of caustic soda to remove the oxide coating, and finally treating the plates with nitro-muriatic acid to develop the crystallization.

3. An apparatus for heating tin plates in the process of crystallization, consisting of a gas-receiving chamber having a plane upper surface perforated throughout with holes, a portion of which, adjacent to the edges of the chamber, are larger than the other or remaining holes, substantially as shown and described, for the purpose set forth.

4. An apparatus for cooling tin plates in the process of crystallization, consisting of a water-distributing chamber and of a series of spouts projecting upwardly from the top of such chamber in a fixed relation to each other, and with their orifices in the same horizontal plane, said spouts serving as supports for plates to be crystallized, substantially as shown and described, for the purpose set forth.

In testimony whereof I hereunto set my hand and seal in the presence of two subscribing witnesses.

CHARLES R. H. M. HABENICHT. [L. S.]

Witnesses:
  W. HAUFF,
  CHAS. WAHLERS.